United States Patent Office 3,072,619
Patented Jan. 8, 1963

3,072,619
METHOD FOR IMPROVING STABILITY OF AROMATIC SULFONATES
Albin F. Turbak, New Providence, N.J., assignor to Esso Research and Engineering Company, a corporation of Delaware
No Drawing. Filed Dec. 21, 1959, Ser. No. 860,675
8 Claims. (Cl. 260—79.3)

This invention relates to a method for improving the stability of polyaromatic $SO_3$ sulfonation products which comprises washing the acidic product of sulfonation with a liquid in which the resulting acid is insoluble.

In particular this invention relates to a method for improving the thermal stability of polyaromatic sulfonates prepared by a process of sulfonation wherein the sulfonating agent is an $SO_3$-organic complex that partially reduces the reactivity of $SO_3$, which comprises washing the product of such sulfonation with a halogenated hydrocarbon immediately after sulfonation while such product is still in a state of dilatation.

More particularly this invention relates to a method for improving the thermal stability of aqueous solutions of polyaromatic sulfonates prepared by sulfonating an alkenyl aromatic polymer with a complex of $SO_3$ and an organic compound containing both phosphorus and oxygen in a liquid medium in which said polymer is soluble but which is incapable under the conditions of reaction of solubilizing the resulting sulfonation product. This method comprises washing such sulfonation product after separation of such product from the reaction mixture with about 5 to 50 parts by weight of a $C_1$–$C_8$ halogen substituted hydrocarbon that melts below 25° C. and boils at a temperature above 40° C. The preferred halogen substituents are selected from the group consisting of chlorine, fluorine and bromine. The sulfonation product upon precipitation from the solvent employed in the reaction is dilated or swollen. It appears as a dispersible, powder-like filterable solid. The washing step should be continued until the product is converted to a gum-like, spongy solid mass.

Where the sulfonation product is to be neutralized to the corresponding alkali or alkaline earth metal salt the washing step to effect thermal stability must come between sulfonation and neutralization. Where the sulfonation product is to be left in the free acid state the washing step must be carried out between sulfonation and drying, i.e. while the sulfonated polymer is still in a state of dilatation.

Suitable halogenated wash liquids for use with this invention include, by way of example, methylene chloride, chloroform, carbon tetrachloride, 1,1,2,2,tetrachloroethane, 1,2-dichloroethane, propylene dichloride, 1,2,3-trichloropropane, 2-chlorobutane, chlorobenzene, cyclohexyl chloride, 1-chlorohexane, 1-chloroheptane, 1-chlorooctane, methylene bromide, bromoform, 1,2-dibromopropane, 1,2,3-tribromopropane, bromobenzene, 1-bromobutane, 1-bromocyclohexane, 1-fluoropentane, 1-bromohexane, etc. The chlorinated hydrocarbons are preferred and of these 1,2-dichloroethane is most preferred.

Polyaromatic sulfonates have a tendency to undergo undesirable changes in viscosity and pH upon aging. These changes adversely affect the use of such sulfonates. For example, when used in viscous aqueous flooding for secondary recovery of oil, both viscosity and pH retention are very important. Similarly, for use in textile printing or sizing applications an appreciable lowering of pH would damage cellulosic fibers by acid hydrolysis.

It now has been discovered that such sulfonates can be prepared which have superior aging and pH stability by washing the sulfonation product immediately after the sulfonation step and prior to drying and/or neutralization or other processing to isolate the free acid, according to the methods of this invention while the sulfonation product is in a softened swollen state. It has further been discovered that the proper conditioning of such sulfonates to afford thermal stability is critically dependent upon carrying out the aforesaid washing at this particular stage in the production of such sulfonates. Neither washing of the polymer feedstock prior to the sulfonation reaction nor reprecipitation, a more thorough and complicated method of purification, exerts any noticeable beneficial effect on the stability of the resulting sulfonates. On the other hand washing or other methods of purification after neutralization or isolation of product are equally useless for this purpose.

Sulfonated polymers are useful as aqueous thickeners, impregnants, adhesives, soil conditioners and textile-sizes, and it is important to reduce the number of cross-linkages to the smallest possible number so that they will have even greater utilization in the aforementioned fields.

The sulfonation of unsaturated substances such as olefins, aromatics and alkenyl aromatic-containing polymers can be easily controlled and regulated by the use of certain $SO_3$-organic complexes which partially reduce the activity of $SO_3$ at temperatures up to 100° C. Such complexes can be prepared by admixing $SO_3$ with an organic compound selected from the group consisting of acyclic ethers, e.g. dibutyl ether, bis (beta chloroethyl ether) and any dialkyl ethers of polyalkyl oxide structures such as dibutyl Carbitol; cyclic ethers, e.g. dioxane and tetrahydrofuran; tertiary nitrogen containing compounds, e.g. trimethyl amine, dimethylamine, and N,N'-dimethyl formamide, nitrogen containing heterocyclic compounds, e.g. pyridine, picoline and lutidine; and compounds which contain both phosphorus and oxygen. In the preparation of the $SO_3$ complexes with phosphorus and oxygen containing organic compounds the phosphorus may be either trivalent or pentavalent. Various organic phosphite, phosphinite, phosphinate, phosphate, phosphonate, phosphonite, pyrophosphate and metaphosphate compounds may be employed to prepare the complexed product. The compounds may contain from 0 to 3 ester oxygens in the case of the pentavalent phosphorus compounds and 1 to 3 ester oxygens in the case of the trivalent phosphorus compounds. These compounds may, of course, contain oxygen other than the aforesaid ester oxygens. The ester oxygens may have alkyl, aryl, alkylaryl or arylalkyl groups attached to them containing 1 to 18 carbon atoms. Similar organic groups may be attached to the phosphorus directly. These organic groups should be relatively nonreactive, especially with the $SO_3$ used to form the complex. If a reaction does occur between the sulfur trioxide and the organic group attached to the phosphorus it will be necessary to use additional sulfur trioxide to compensate for the loss. Among the organic phosphorus and oxygen-containing compounds which may be employed for this purpose are the following: triethyl phosphate, trimethyl phosphate, tripropyl phosphate, tri-butyl phosphate, triethyl phosphite, trimethyl phosphite, tripropyl phosphite, tri-butyl phosphite, diethyl hydrogen phosphate, dimethyl hydrogen phosphate, diethyl hydrogen phosphite, dimethyl hydrogen phosphite, ethyl dihydrogen phosphate, methyl dihydrogen phosphate, ethyl dihydrogen phosphite, methyl dihydrogen phosphite, tris (2,4 - dichlorophenyl) phosphate, tris (2,4 - dichlorophenyl) phosphite, bis (2,4-dichlorophenyl) hydrogen phosphate, bis (2,4-dichlorophenyl) hydrogen phosphite, tris (p-nitrophenyl) hydrogen phosphate, bis (p-nitrophenyl) hydrogen phosphite, tris (p-sulfophenyl) phosphate, tris (p-sulfophenyl) phosphite, 2,4-dichlorophenyl dihydrogen phosphate, 2,4-dichlorophenyl dihydrogen phosphite, tetraethyl pyrophosphate, tetramethyl pyrophosphate, dimethyl diethyl pyrophosphate, ethyl metaphosphate, bis (2,4-dichlorophenyl) diethyl pyrophosphate, sym-p-nitrophenyl pyrophosphate, p-nitrophenyl metaphosphate, tris (B-chloroethyl) phosphate, tetra (B-chloroethyl) pyrophosphate, diethyl dihydrogen pyrophosphate, di (2,4-dichlorophenyl) dihydrogen pyrophosphate, tris (2,4,6-trimethylphenyl) phosphate, tris (2,4,6-trimethylbenzyl) phosphate, tri-lauryl phosphate and tri-stearyl phosphate. When used in sulfonation reactions they permit one to sulfonate under much less rigorous conditions than were heretofore possible. In a preferred embodiment, the organic component of the complex, e.g. the phosphorus and oxygen-containing compound, and sulfur trioxide are contacted to form the complex prior to admixing them with the polymer. However, it is not essential to premix the sulfur trioxide with the organic component, but rather it is only necessary to have the latter compound present during the sulfonating reaction. For instance, the sulfur trioxide and phosphorus and oxygen-containing compound may be admixed simultaneously with the polymer and the complex may be formed in situ in the sulfonating zone. Because the organic component of the complex affects the reactivity of the available sulfur trioxide, the sulfonation temperature need not be maintained below 0° C., but rather it may vary from as low as −100° C. to as high as 100° C. Moreover, the pressure is not critical and may be adjusted to any satisfactory level. For instance, the sulfonation may be carried out from a reduced pressure of, say, about 0.5 atmosphere up to a superatmospheric pressure in the area of 20 atmospheres. The most suitable conditions from an economic standpoint are temperatures of 15° to 40° C. and pressures which are approximately atmospheric. The sulfonation time will, of course, vary with the particular conditions selected and the compound or polymer being sulfonated, although the reaction is generally complete within a few seconds to several hours after the reactants are contacted with each other. When sulfonating at approximately room temperature and atmospheric pressure, the contact time should be about 5 seconds to 25 or 30 minutes. Since the organic component of the complex reduces the activity of the sulfur trioxide, it is not necessary to stringently limit the sulfonating time in order to minimize cross-linking as is required in other processes.

The other $SO_3$ complexes hereinbefore mentioned can be prepared in the same manner as the foregoing phosphorus and oxygen containing complexes and can be prepared by a simple mixing of the organic component therein with the desired equivalent of $SO_3$. For instance, one molar part of dioxane may be added to one or two molar parts of $SO_3$ in dichloroethane to form either the 1:1 or 1:2 dioxane-$SO_3$ complex, and equimolar amounts of pyridine and $SO_3$ can be added together in the same way to form the 1:1 pyridine-$SO_3$ complex.

The alkenyl aromatic-containing polymers which may be sulfonated in accordance with the invention should be at least dimers or pentamers and may contain up to 50,000 or 100,000 monomer units or more per chain. While the polymer should contain a substantial number of alkenyl aromatic units, it is not necessary that they be homopolymers. Thus, various copolymers and terpolymers containing up to 50 or 90% of a nonaromatic ethylenically unsaturated monomer may also be sulfonated in accordance with this process. For instance, copolymers of from 70 to 98% styrene and from 30 to 2% acrylonitrile may be used. Other suitable copolymers include copolymers of from 65 to 98% vinyl toluene and from 35 to 2% acrylonitrile, terpolymers of styrene, vinyl toluene and from 2 to 35% acrylonitrile, terpolymers of from 60 to 75% alphamethyl styrene, 20 to 25% acrylonitrile and 5 to 10% ethyl methacrylate, copolymers of styrene and sulfur dioxide, copolymers or terpolymers of from 68 to 95% of either or both of the compounds styrene and styrene-vinyl toluene and from 5 to 32% of maleic anhydride, copolymers of from 60 to 87% of either or both of the compounds styrene and styrene-vinyl toluene and from 13 to 40% of ethyl methacrylate, the copolymer of 75% styrene and 25% ethyl acrylate, copolymers of 5 to 30% styrene and 70 to 95% butadiene-1,3, and other copolymers of styrene and vinyl toluene, etc.

The alkenyl aryl group in the polymer may consist wholly of hydrogen and carbon atoms or it may be substituted with other atoms, such as halogen atoms, or groups which are less reactive to sulfur trioxide than the aromatic ring in the alkenyl aryl group. A generic formula for the alkenyl aromatic unit is as follows:

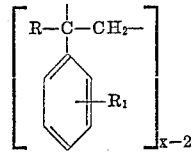

in which R is an alkyl, aryl, alkaryl, halogen or hydrogen, said alkyl, aryl or alkaryl group containing from 1 to 8 carbon atoms, and $R_1$ is an alkyl, aryl, alkaryl, hydrogen or any substituent having a Hammett sigma value of −1.50 to +1.50 inclusive and which is less reactive with sulfur trioxide than the aromatic ring under the conditions of sulfonation.

The viscosity of the polymer solution prior to sulfonation may vary from 1 to 3000 centipoises at 25° C. as measured by the Brookfield viscosimeter fitted with an ultra low shear rate adapter. For intance, polystyrene may be dissolved in dichloroethane to make a 2.1 wt. percent solution which is then measured with a Brookfield viscosimeter as already mentioned. Depending upon the molecular weight of the polystyrene, it will have a viscosity ranging from about 5 to 2000 centipoises. Other alkenyl aromatic-containing polymers having comparable viscosities or molecular weights may also be sulfonated according to the process of the present invention.

In a preferred embodiment, the sulfur trioxide is admixed with the organic complexing compound in the presence of an inert solvent, such as a halogenated hydrocarbon or an inert gas, at a temperature of −30 to about 100° C. Since the available sulfur trioxide and organic complexing compound, e.g. a phosphorus and oxygen-containing compound react exothermally to form a complex, it is best to have a substantial amount of an inert organic diluent present to assist in the dissipation of the heat of reaction. Suitable solvents include such compounds as carbon tetrachloride, chloroform, dichloroethane, methylene chloride and other inert halogen-containing hydrocarbon compounds. Other nonhalogen-containing solvents may be used. Any solvent which will dissolve the polymer and the sulfur trioxide-organic complex and be unreactive with the complex is considered a suitable solvent.

The sulfonated alkenyl aromatic-containing polymer will precipitate out of solution when the sulfonation is carried out in a solvent as hereinbefore described. This precipitate may be separated from the liquid by conventional techniques such as decanting, filtering or centrifuging.

It is at this stage in the production of these sulfonates, and only at this stage, that the conditioning of the precipitate must be effected to insure the subsequent stability of the desired sulfonates. It has been found that washing the precipitated polymer directly after sulfonation is a very critical step in the preparation of a thermally stable product which also does not suffer large changes in viscosity and pH on aging. After separation of the precipitate from the reaction mixture and before drying and/or neutralizing this acidic product, the precipitate is washed with 5 to 50 parts by weight of the chlorinated solvent per part by weight of the polymeric product. The washing completeness is best indicated by noting the physical state of the polymer. The original sulfonate is in a powder-like, easily filterable form. As washing is started the product particles tend to stick together. Finally, the particles agglomerate into a gum-like or spongy mass, which point serves to indicate that sufficient washing has taken place. After the sulfonated polymer has been washed in accordance with this invention it may be dried directly in a hot air stream or a vacuum oven at a temperature of less than 100° C., e.g. 50° to 70° C. or neutralized by dissolving the precipitate in a suitable organic solvent such as an aliphatic alcohol, e.g. methyl alcohol, and then adding an aqueous solution of an alkali or alkaline earth metal hydroxide, e.g. 50 wt. percent solution of sodium hydroxide, to the sulfonated polymer to make a substantially neutral alkali metal or alkaline earth metal salt. The sulfonic acid may also be reacted with an amine. The reaction products of such acids with higher molecular weight primary, secondary or tertiary amines such as octadecyl amine, octadecyl dimethyl amine, lauryl amine, dialkyl lauryl amine, pyridine, lauryl pyridine, stearyl pyridine, or other substituted pyridines, palmityl guanidine, octadecyl phenyl amine or other N-substituted aniline derivatives, chitin, and substituted pyrroles are valuable for use as anti-static agents for textile fibers such as nylon. The salt may then be separated from the liquid by centrifuging and decanting the supernatant liquid from the precipitate. Because the sulfonated polymers contain substantially no cross-linking, both the acid and salt are soluble in room temperature water, i.e. 15° to 35° C., up to about 50 or 60 wt. percent, depending upon the molecular weight of the sulfonated polymer. By employing sulfonating temperatures below about 40° C., it is possible to produce sulfonated polymers which are completely free of sulfone cross-linking. The high molecular weight sulfonated polyaromatic polymers, especially those having 10,000 or more monomer units per molecule, are particularly useful as water thickeners. These polymers contain from about 5 to 18 wt. percent combined sulfur and contain no detectable cross-linking.

The following examples will illustrate the practice of the present invention.

EXAMPLE 1

A polystyrene polymer was prepared by mixing 45 grams of styrene with 3.0 cc. of a soap (a sulfated ethylene oxide adduct of phenol), 0.25 gram of potassium persulfate, 0.10 gram of sodium bisulfite and 200 cc. of distilled water. The ingredients were mixed in a flask under $N_2$ atmosphere at 55° C. for 18 hours. The product was then diluted to 400 cc. with water, coagulated with 15 grams of NaCl, filtered, and washed free of chloride ions. The product was dried at 60° C. and 25 mm. vacuum for 18 hours to yield 43.2 grams of products. The viscosity of a solution of 2.1 grams of this product in 100 grams of dichloroethane was 12.20 cp. at 25° C.

EXAMPLE 2

The polymer of Example 1 was sulfonated by dissolving 10 grams of the polymer in 476 cc. of dichloroethane and adding the resulting solution at an average temperature of about —5° C. to an $SO_3$ complex prepared by adding 8.4 cc. of distilled $SO_3$ to 12.2 cc. of distilled triethyl phosphate dissolved in 500 cc. of dichloroethane. After addition a chemical reaction began which was allowed to continue for 10 minutes at an average temperature of about —5° C. A precipitate formed and the solution was then filtered and the precipitated sulfonate was recovered.

The precipitated, sulfonated polymer was divided into two equal parts. Part I was washed twice by slurrying in separate 200 cc. portions of dichloroethane and the washed, coagulated precipitate was again separated by filtration, while part II was simply filtered without washing. Both part I and part II, the unwashed portion, were each dissolved in separate 500 cc. portions of methyl alcohol and neutralized by admixing therewith a 50% aqueous NaOH solution using 3 cc. of 1% alcoholic phenophthalein as indicator. The polymer was in each case separated by centrifuging and each portion was dried in a vacuum oven at 60° C. and 25 mm. pressure for 18 hours. The separated products were then dissolved to give 0.5% solutions in salt water containing 1500 p.p.m. dissolved salts, i.e. primarily NaCl with minor amounts of Mg and Ca salts, and aged by refluxing under an $N_2$ atmosphere. Run I in the following Table I sets forth the respective changes in viscosity and pH of the respective products upon aging. The same procedure starting with the formation of the polystyrene polymer was repeated and the results thereon are labeled Run II in such table.

*Table I*

EFFECT OF WASHING SULFONATED POLYMER IMMEDIATELY AFTER SULFONATION ON THERMAL STABILITY AND pH

| Treatment | Percent S | Percent P | Thermal aging stability (data reported as percent viscosity retention/pH), hours refluxed | | | | | | |
|---|---|---|---|---|---|---|---|---|---|
| | | | 0 | 4 | 24 | 48 | 68 | 312 | 480 |
| Run I: | | | | | | | | | |
| Washed | 14.8 | 0.47 | 100/7.6 | 100/9.2 | 89/8.9 | 91/8.7 | | 81/8.3 | 75/7.8 |
| Not washed | 15.0 | 0.70 | 100/8.4 | 93/8.1 | 86/8.4 | 84/7.2 | | 42/4.2 | 29/4.1 |
| Run II: | | | | | | | | | |
| Washed | 15.0 | 0.23 | 100/9.4 | 95/9.0 | | | 89/8.5 | 81/8.2 | |
| Not washed | 15.4 | 0.50 | 100/9.5 | 85/5.9 | | | 47/3.8 | 23/3.2 | |

EXAMPLE 3

The procedure of Example 2 is repeated except that carbon tetrachloride is used to wash the precipitate and similar results are obtained.

EXAMPLE 4

The procedure of Example 2 is repeated except that bromobenzene is used to wash the precipitate and similar results are obtained.

EXAMPLE 5

The procedure of Example 2 is repeated except that chlorocyclohexane is used to wash the precipitate and similar results are obtained.

EXAMPLE 6

The procedure of Example 2 is repeated except that 1-fluoropentane is used to wash the precipitate and similar results are obtained.

EXAMPLE 7

A polystyrene polymer was prepared as in Example 1 except that 0.25 gram of azo-bis (isobutyronitrile) was employed as the catalyst in lieu of the potassium persulfate and sodium bisulfite employed in Example 1.

This polymer was recovered and sulfonated as in Example 2. The sulfonic acid precipitate was divided into two portions one of which was washed as in Example 2 and the same procedures of neutralization and aging conducted as in Example 2. The improvements in thermal stability demonstrated by the washed polymer in Example 2 were again demonstrated.

EXAMPLE 8

A procedure in accordance with Example 7 was carried out except that in lieu of the azo-bis (isobutyronitrile) catalyst 0.25 gram of cumene hydroperoxide were employed. The washed portion of the polymer again demonstrated increased thermal stability as compared to the unwashed portion.

EXAMPLE 9

A test was made to determine whether the undesirable changes in viscosity resulted from some contaminant such as residual catalyst in the virgin polymer used for sulfonation. A portion of polystyrene was purified previous to sulfonation by dissolving it in dichloroethane and adding the solution to methyl alcohol from which the polymer precipitated.

The results of this purification upon improving the thermal stability of the sulfonate made from this polymer according to the method of Example 2 are set forth in Table II.

It is obvious from these data that purification of impurities from the original polymer by the standard technique of precipitation did not improve the resultant polymer sulfonate stability.

Washing of the polyaromatic compound prior to sulfonation does not exert any beneficial effect on the resultant polymer sulfonate stability to thermal degradation or pH changes. This should be contrasted to the data in Table I which show that washing directly after sulfonation exerts a beneficial effect on the polymer aging characteristics.

EXAMPLE 11

The polystyrene sulfonate is washed as in Example 2 but the washing is carried out after neutralization.

Table IV
EFFECT OF WASHING AFTER NEUTRALIZATION

| Polymer | Conc. (percent) | Reflux aging stability (reported as viscosity/pH),[1] hours refluxed | | | | |
|---|---|---|---|---|---|---|
| | | 0 | 4 | 24 | 48 | 96 |
| 1. Regular product | 0.3 | 18.4/8.7 | 14.0/5.4 | 8.0/4.0 | -------- | 3.6/3.8 |
| 2. Washed with $Cl_2C_2H_4$ after neutralizing and drying | 0.3 | 18.0/8.6 | -------- | 8.2/4.2 | 6.2/4.0 | 3.5/3.7 |

[1] Viscosity reported in centipoise, Brookfield viscosity, 60° C., 30 r.p.m. U.L. adapter.

It is obvious from the above data that washing after neutralization with solvent used for sulfonation ($ClCH_2CH_2Cl$) has no effect on the resultant stability of the product to both degradation and pH changes. This should be contrasted to the effect of washing directly after sulfonation (see Table I) where a definite beneficial effect is observed.

EXAMPLE 12

The polymer is washed as in Example 2 but the washing is carried out on the free acid form after drying. No improvement in subsequent stability is observed.

The factors, ingredients or contaminants responsible

Table II
PURIFICATION OF POLYMERS BEFORE SULFONATION DOES NOT INCREASE THE RESULTANT SULFONATE THERMAL STABILITY [1]

| Polymer | Viscosity of a 2.1% solution in $C_2H_4Cl_2$ (cp. at 25° C.)[2] | Percent conc. in salt water [4] | Thermal stability of aqueous sulfonate solutions (reported as percent visc. retention/pH), hours refluxed [3] | | | | | |
|---|---|---|---|---|---|---|---|---|
| | | | 0 | 4 | 24 | 48 | 72 | 96 |
| Polystyrene-A | 45 | 0.30 | 100/8.7 | 76/5.3 | 43/4.0 | -------- | -------- | 19/3.8 |
| Polystyrene-A-purified | 45 | 0.25 | 100/8.0 | 71/3.5 | 27/3.4 | 20/3.3 | -------- | -------- |
| Polystyrene-B | 160 | 0.16 | 100/7.3 | 78/8.9 | 52/7.8 | -------- | 35/7.2 | -------- |
| Polystyrene-B-purified | 640 | 0.20 | 100/8.5 | 57/3.7 | 28/3.6 | 14/3.5 | -------- | -------- |

[1] Purified by dissolving in $C_2H_4Cl_2$ and precipitating into MeOH.
[2] These values give a relative measure of molecular weight of the product.
[3] Brookfield viscosities measured at 60° C. and 30 r.p.m. with U.L. adapter were taken.
[4] The water contained 1,500 p.p.m. dissolved salts.

EXAMPLE 10

In lieu of the procedure in Example 9 the polystyrene polymer is washed as in Example 2 with dichloroethane but the washing step is carried out prior to sulfonation. No improvement in stability of the subsequently prepared sulfonate is evidenced.

Table III
EFFECT OF WASHING POLYMER PRIOR TO SULFONATION

| Polymer | Conc. (percent) | Thermal stability of aqueous solution of sulfonate (data reported as percent viscosity retention/pH), hours refluxed | | | |
|---|---|---|---|---|---|
| | | 0 | 4 | 24 | 96 |
| 1. Regular unwashed polystyrene | 0.3 | 100/8.7 | 76/5.3 | 43/4.0 | 19/3.8 |
| 2. Polystyrene washed with $Cl_2C_2H_4$ prior to sulfonation | 0.3 | 100/8.6 | 74/5.2 | 41/4.1 | 19/3.8 | for changes in viscosity and pH during the aging of polyaromatic polymers prepared by using an $SO_3$ complex as the sulfonating agent are not fully understood. That the problem cannot be solved by washing or otherwise purifying the polymer feedstock to the sulfonation reaction has been demonstrated. Likewise attempts to condition the sulfonation product against such changes after the product has been dried or reacted with another substance have proven futile. Whatever the source responsible for such changes during aging the only known means for conditioning the sulfonates against such changes is by washing the sulfonate immediately after the sulfonation step with a liquid of the type hereinbefore specified while the precipitated polymeric sulfonic acid is in a softened and swollen condition.

This application is a continuation-in-part of U.S. application S.N. 803,382, filed April 1, 1959.

What is claimed is:
1. A method for stabilizing a substantially cross-link free sulfonated alkenyl aromatic polymer to thermal aging, said polymer being precipitated from an $SO_3$-containing sulfonation reaction mixture in the form of a solid sulfonic acid, which comprises washing said acid with a halogenated hydrocarbon after separating said acid from the reaction mixture and before neutralizing the acid.

2. A method in accordance with claim 1 wherein said solid sulfonic acid is a polystyrene sulfonic acid.

3. A method for stabilizing a substantially cross-link free sulfonated alkenyl aromatic polymer to thermal aging, said polymer being precipitated from an $SO_3$-containing sulfonation reaction mixture in the form of a solid sulfonic acid, which comprises washing said acid with 5 to 50 parts by weight of a $C_1$ to $C_8$ halogenated hydrocarbon liquid per part by weight of said acid, the halogen in said halogenated hydrocarbon being selected from the group consisting of chlorine, bromine and fluorine, said washing being continued until said acid becomes gum-like.

4. A method for stabilizing a substantially cross-link free sulfonated alkenyl aromatic polymer to thermal aging, said polymer being precipitated from an $SO_3$-containing sulfonation reaction mixture in the form of a solid sulfonic acid, which comprises washing said acid with a $C_1$ to $C_8$ halogenated hydrocarbon liquid after separating the acid from said reaction mixture and while the acid is still in a swollen state, the halogen in said halogenated hydrocarbon being selected from the group consisting of chlorine, bromine and fluorine, said washing being continued until said acid becomes gum-like.

5. A method for stabilizing a substantially cross-linked free sulfonated alkenyl aromatic polymer to thermal aging, said polymer being precipitated from an $SO_3$-containing sulfonation reaction mixture in the form of a solid sulfonic acid, which comprises slurrying said acid with 5 to 50 parts by weight of a $C_1$ to $C_8$ chlorinated hydrocarbon liquid per part by weight of said acid immediately after separation of the acid from the reaction mixture, said slurrying being continued until said acid becomes gum-like.

6. A method in accordance with claim 5 wherein at least a part of said $SO_3$ in said reaction mixture is in the form of an $SO_3$-organic phosphorous complex.

7. In a process for sulfonating a substantially cross-link free alkenyl aromatic polymer comprising contacting said polymer with a sulfonating agent consisting essentially of the reaction product of sulfur trioxide and an organic compound selected from the group consisting of acyclic ethers, cyclic ethers, tertiary nitrogen containing compounds, nitrogen containing heterocyclic compounds, and compounds which contain both phosphorous and oxygen and an inert solvent in which said polymer is soluble but in which the resulting sulfonation product is insoluble, and separating the resulting solid precipitate in a swollen state from said reaction mixture, the improvement which comprises stabilizing the sulfonated polymer to thermal aging by slurrying said acid after said separation with a $C_1$ to $C_8$ chlorinated hydrocarbon liquid and separating the acid from the chlorinated hydrocarbon, said slurrying being continued until said acid becomes gum-like.

8. In a process for sulfonating polystyrene comprising contacting said polystyrene with a sulfonating agent consisting of a complex of sulfur trioxide and triethyl phosphate, separating the resulting solid sulfonic acid from the reaction mixture and neutralizing the acid to make an alkali metal salt, the improvement which comprises slurrying the separated acid in a swollen state with a $C_1$ to $C_8$ chlorinated hydrocarbon liquid until the acid becomes gum-like and thereafter separating the acid from the chlorinated hydrocarbon liquid for neutralization.

References Cited in the file of this patent

UNITED STATES PATENTS

| 2,763,634 | Teot | Sept. 18, 1956 |
| 2,764,561 | McMaster et al. | Sept. 25, 1956 |